US008998716B2

(12) United States Patent
Omi

(10) Patent No.: US 8,998,716 B2
(45) Date of Patent: *Apr. 7, 2015

(54) GAMING SYSTEM FOR UPDATING A PRESENTATION OF A VIRTUAL GAME ENVIRONMENT

(71) Applicant: Zynga Inc., San Francisco, CA (US)

(72) Inventor: Gregory Omi, Brisbane, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/969,781

(22) Filed: Aug. 19, 2013

(65) Prior Publication Data

US 2014/0051511 A1    Feb. 20, 2014

Related U.S. Application Data

(63) Continuation of application No. 13/558,384, filed on Jul. 26, 2012, now Pat. No. 8,512,140.

(51) Int. Cl.
*A63F 13/04* (2006.01)
*A63F 13/00* (2014.01)
*A63F 13/358* (2014.01)
*A63F 13/77* (2014.01)
*H04N 19/00* (2014.01)

(52) U.S. Cl.
CPC ............... *A63F 13/00* (2013.01); *A63F 13/358* (2013.01); *A63F 13/77* (2013.01); *H04N 19/00* (2013.01)

(58) Field of Classification Search
USPC .................. 463/33–43; 340/870.07; 382/199; 348/571
See application file for complete search history.

(56) References Cited

U.S. PATENT DOCUMENTS

| 8,194,136 | B1 | 6/2012 | Askey et al. |
| 8,512,140 | B1 | 8/2013 | Omi |
| 2005/0135390 | A1 | 6/2005 | Anderson et al. |
| 2009/0232401 | A1 | 9/2009 | Yamashita et al. |
| 2010/0105475 | A1 | 4/2010 | Mikhailov et al. |
| 2010/0277411 | A1 | 11/2010 | Yee et al. |
| 2011/0304475 | A1 | 12/2011 | Higgins et al. |

OTHER PUBLICATIONS

"U.S. Appl. No. 13/558,384, Notice of Allowance mailed Jun. 11, 2013", 9 pgs.

*Primary Examiner* — Masud Ahmed
(74) *Attorney, Agent, or Firm* — Schwegman Lundberg & Woessner, P.A.

(57) ABSTRACT

A system, a computer readable storage medium storing at least one program, and a computer-implemented method for updating a performance of a presentation of a virtual game environment. A presentation of a virtual game environment is generated based on a visual attribute. The visual attribute may identify a visual quality of the presentation of the virtual game environment. A visual performance metric associated with the presentation of the virtual game environment is then monitored. The visual attribute then updated based on the visual performance metric. After the visual attribute is updated, an updated presentation of the virtual game environment is generated based on the updated visual attribute.

20 Claims, 7 Drawing Sheets

GAMING SYSTEM FOR UPDATING A PRESENTATION OF A VIRTUAL GAME ENVIRONMENT

CLAIM OF PRIORITY

This application is a continuation of U.S. patent application Ser. No. 13/558,384, filed on Jul. 26, 2012, and issued as U.S. Pat. No. 8,512,140 on Aug. 20, 2013, which is incorporated by reference herein in its entirety.

TECHNICAL FIELD

The present disclosure relates to gaming platforms. In particular, an example gaming platform is provided to update a presentation of a virtual game environment.

BACKGROUND

In conventional game systems, a game provider may launch or otherwise release a game that consumes a comparatively high amount of computing resources (e.g., processor execution time, video card memory, etc.) to display or otherwise render high quality images and/or videos. In some cases, players using high-end game systems may be able to operate the game with little to no degradation of the presentation quality of the game. In other cases, players with lower performing game systems (e.g., mobile devices) may experience degradation of the presentation quality while playing the game.

To broaden the range of game systems that has access to a game, game providers often provide users with a mechanism to configure one or more visual attributes associated with the game. As used herein, the term "visual attribute" may refer to an attribute that identifies a visual quality used to render a presentation of a game. An attribute that identifies a pixel count or screen resolution of a game is an example of a visual attribute. Other examples of a visual attribute include attributes that determine a three-dimensional model, visual effect, image quality, animation, or any other suitable attribute. In conventional systems, a player may configure the visual attributes through a specific menu directed to the video options of the game.

Thus, in conventional game system, a player updates the visual presentation of a game through a menu provided by the game.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
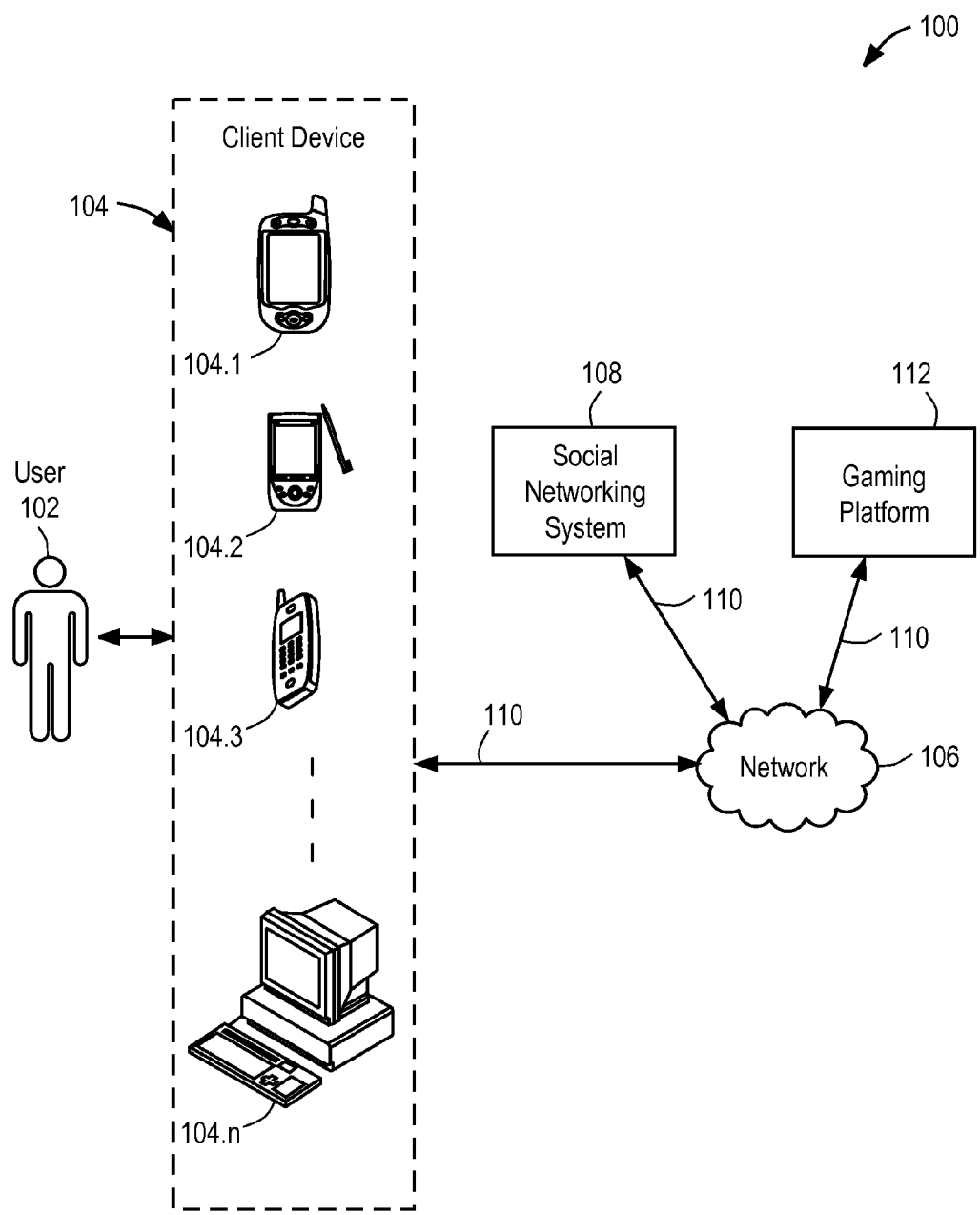
FIG. 1 illustrates an example of a gaming environment for implementing various example embodiments.

Users of computer-implemented systems may access a gaming platform to interact with a virtual game environment. For example, through a gaming platform, as provided by Zynga, Inc., a user (e.g., a player) may use a client device (e.g., a mobile phone, laptop, desktop, or any other computing device) to access a virtual game environment. By way of example and not limitation, the virtual game environment may include data that may be used to render a visual presentation of a game, such as a virtual landscape with a number of virtual objects, such as virtual crops, avatars, virtual animals, virtual buildings, and the like. In some embodiments, a visual attribute may be used to render a presentation of the virtual game environment according to a given visual quality. For example, the visual attribute that identifies a comparatively high pixel count or screen resolution may be used to render a high quality image in the presentation of a virtual gaming environment, while a visual attribute that identifies a comparatively low pixel count or screen resolution may be used to render a lower quality image in the presentation of the virtual gaming environment.

Once a presentation of the virtual game environment is generated, the gaming platform may then monitor a visual performance metric associated with the presentation of a virtual game. As used herein, the term "visual performance metric" may refer to any suitable measurement of the performance of the presentation of a virtual game environment. A frame rate is an example of a visual performance metric that may be monitored by embodiments described herein. For example, in some embodiments, the gaming platform may periodically sample a frame rate achieved in the presentation the virtual environment over a period of time. In other embodiments, a visual performance metric is a number of stalls in a given time period. Such stall may occur, when for example, a game needs to buffer game data used to render a presentation of a game.

For the purpose of clarity, the term "presentation" may refer to a visual rendering of a game to the user. In a client-server architecture, a server may generate a presentation by sending game data that is then rendered by a client device, while a client device may render a presentation by processing game data into signals that are displayed by a display device (e.g., a monitor or screen). In some embodiments, the presentation of the virtual game environment involves an animation of the virtual game environment, as may be controlled by a game engine or a presentation module (as discussed below). Thus, a presentation of a virtual game environment may include a sequence of frames including images of game objects within a virtual environment. The sequence of frames may be used to render an animation of dynamic movements of the virtual environment and corresponding game objects.

Based on the visual performance metric, the gaming platform may update the visual attribute. For example, based on detecting that the visual performance metric (e.g., a frame rate) is below a threshold value, a game system may lower a pixel count. An updated presentation of the virtual game environment is then generated to incorporate the updated visual attribute.

It is to be appreciated that a gaming platform capable of optimizing performance based on a visual performance metric may find many practical applications. For example, updating a visual attribute based on a monitored visual performance metric may, in some embodiments, provide for automatic adjustment of the quality of the presentation of a virtual game environment. Accordingly, upon detecting that a frame-rate has fallen below a threshold value, the game system may automatically lower a pixel count of one or more images displayed in the virtual game environment. With a lower pixel count, the game platform may then be able to generate the presentation of the virtual game environment with an acceptable frame rate.

These and other embodiments of the invention are described, by way of example, in further detail below.

Example System

FIG. 1 illustrates an example of a gaming environment 100 for implementing various example embodiments. In some embodiments, the gaming environment 100 comprises a user 102, a client device 104, a network 106, and a social networking system 108. The components of the gaming environment 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the gaming platform 112, and the network 106, any suitable arrangement or configuration of the user 102, the client device 104, the social networking system 108, the gaming platform 112, and the network 106 may be contemplated.

The client device 104 may be any suitable computing device (e.g., devices 104.1-104.$n$), such as a smart phone 104.1, a personal digital assistant 104.2, a mobile phone 104.3, a personal computer 104.$n$, a laptop, a computing tablet, or any other device suitable for playing a virtual game. The client device 104 may access the social networking system 108 or the gaming platform 112 directly, via the network 106, or via a third-party system. For example, the client device 104 may access the gaming platform 112 via the social networking system 108.

The social networking system 108 may include a network-addressable computing system that can host one or more social graphs (see for example FIG. 2), and may be accessed by the other components of system 100 either directly or via the network 106. The social networking system 108 may generate, store, receive, and transmit social networking data.

Figure 2:
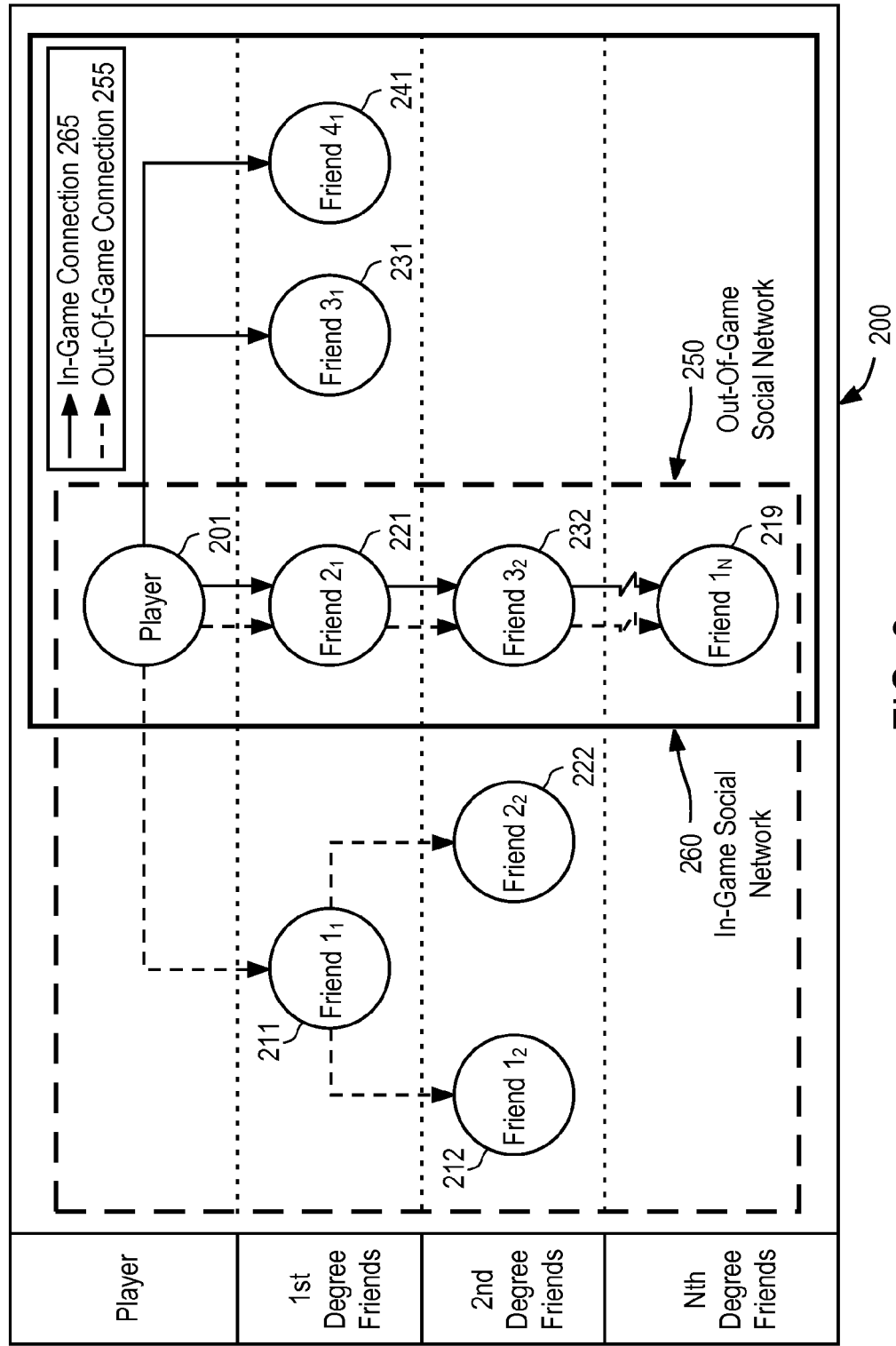
FIG. 2 shows an example of a social network within a social graph, according to some embodiments.

FIG. 2 shows an example of a social network within a social graph 200. The social graph 200 is shown by way of example to include an out-of-game social network 250 and an in-game social network 260. Moreover, the in-game social network 260 may include one or more users that are friends with Player 201 (e.g., Friend $3_1$ 231), and may include one or more other users that are not friends with Player 201. The social graph 200 may correspond to the various users associated with the virtual game.

With reference back to FIG. 1, the gaming platform 112 may include a network-addressable computing system (or systems) that can host one or more virtual games, for example, online games. The gaming platform 112 may generate, store, receive, and transmit game-related data, such as, for example, game account data, game input, game state data, and game displays. The gaming platform 112 may be accessed by the other components of the gaming environment 100 either directly or via the network 106. The user 102 may use the client device 104 to access, send data to, and receive data from the social networking system 108 and/or the gaming platform 112.

Figure 3:
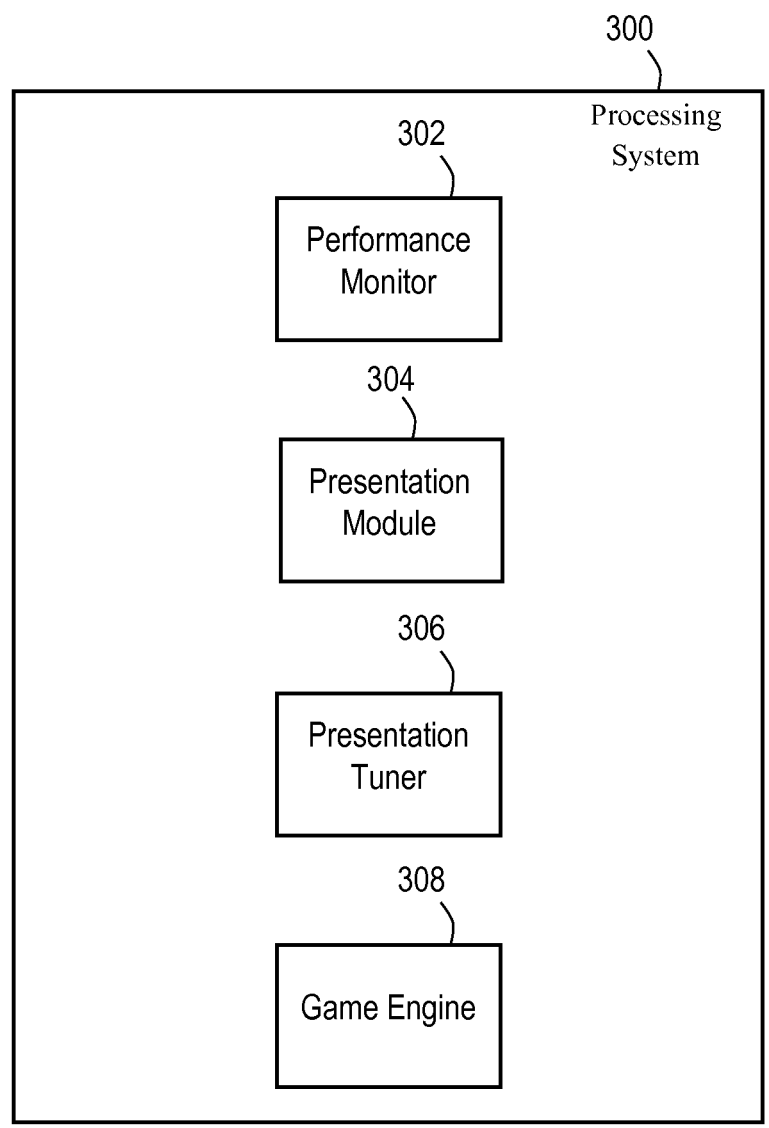
FIG. 3 is a block diagram depicting various modules, in accordance with example embodiments, that may be included in a processing system.

FIG. 3 is a block diagram depicting various modules, in accordance with example embodiments, that may be included in a processing system 300. It should be appreciated that the processing system 300 may be deployed in the form of, for example, a server computer, a client computer, a personal computer, a laptop computer, a mobile phone, a personal digital assistant, and other processing systems. For example, in one embodiment, the processing system 300 may be embodied as the gaming platform 112 of the gaming environment 100 depicted in FIG. 1. In an alternate embodiment, the processing system 300 may be embodied as the client device 104 of the gaming environment 100. As a further example, according to some embodiments, the processing system 300 may be embodied as a combination of the gaming platform 112 and the client device 104 of the gaming environment 100 depicted in FIG. 1. Referring to FIG. 3, in various embodiments, the processing system 300 may be used to implement computer programs, logic, applications, methods, processes, or software to optimize game performance based on a visual performance metric, as described in more detail below.

A performance monitor 302 may be configured to monitor a visual performance metric associated with a presentation of a virtual game environment rendered on a client device. In an example embodiment, the performance monitor 302 may sample game data to determine the current value associated with a particular visual performance metric. Using frame rate as an example of a visual performance metric, the performance monitor 302 may sample a presentation module (e.g., the presentation module 304, described below) to determine a frame rate associated with a particular point in time or over a period of time (e.g., over a rolling window). In some embodiments, the performance monitor 302 may be configured to detect occurrences of a presentation adjustment condition. As used herein, the term "presentation adjustment condition" may refer to any suitable condition that indicates that a visual quality is outside a desired range.

A presentation module 304, according to various embodiments, may be configured to perform operations related to generating a presentation of a virtual game environment. For example, the presentation module 304 may process game-related data, such as, for example, game account data, game input, and game state data to generate game displays. In some embodiments, the presentation module 304 may generate a presentation of a virtual game environment based on a visual attribute. For example, by way of example and not limitation, where the visual attribute identifies a pixel count, the presentation module 304 may then generate a presentation of the virtual game environment based on the pixel count identified by the visual attribute.

A presentation tuner 306 may be configured to update a visual attribute associated with a presentation of a virtual game environment. In some embodiments, the presentation tuner 306 updates the visual attribute when a presentation adjustment condition is detected by the performance monitor 302. Updating the visual attribute is described in greater detail below.

A game engine 308 may be configured to generate, receive, transmit, and otherwise process game data. In some embodiments, the game engine 308 may process game logic that determines the general game operations of a particular game (e.g., when a crop is ready to harvest, when a game event is to occur, and the like). The game engine 308, in some embodiments, may interface with the other modules of the processing system 300 to receive and transmit data between the various modules.

It should be appreciated that in other embodiments, the processing system 300 may include fewer, more, or different modules apart from those shown in FIG. 3. For example, in an alternate embodiment, any one of the performance monitor 302, the presentation module 304, the presentation tuner 306, and the game engine may be combined into a single module. In another embodiment, each of the performance monitor 302, the presentation module 304, the presentation tuner 306, and game engine 308 can be separate from and executed or processed in parallel with each other.

Figure 4:
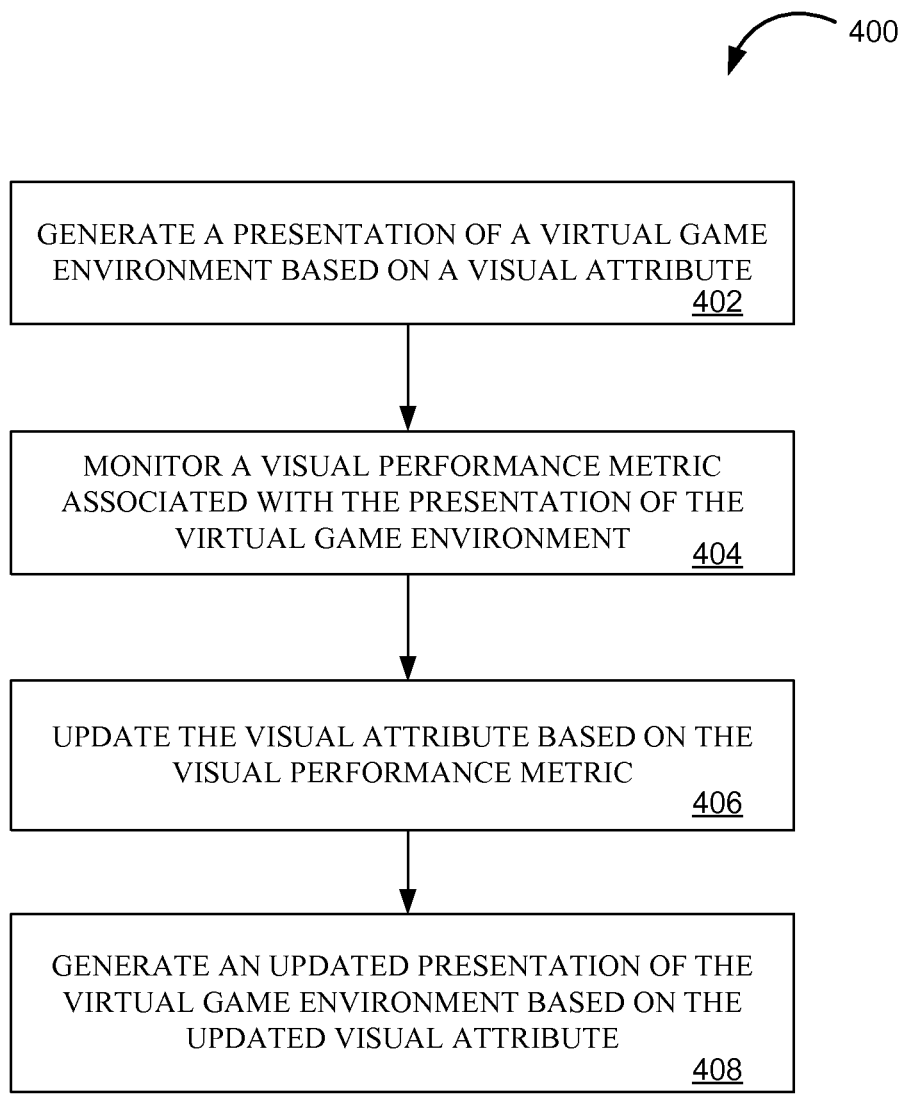
FIG. 4 is a flow chart illustrating a method of updating a presentation of a virtual game environment, according to an example embodiment.

FIG. 4 is a flow chart illustrating a method 400 of updating a presentation of a virtual game environment, according to an example embodiment. In an embodiment, the method 400 may be implemented by the components and modules shown in FIGS. 1 and 3.

As depicted in FIG. 4, the method 400 may begin at operation 402, as may be performed by the presentation module 304, when the method 400 generates a presentation of a virtual game environment based on a visual attribute. To illustrate, according to an example embodiment, the visual attribute may specify a pixel count. Accordingly, the presentation module 304 may generate a presentation of the virtual game environment using a pixel count specified by the visual attribute. In some cases, where the pixel count is a relatively high pixel count, the presentation generated according to the pixel count may result in a comparatively high quality visual image. In some cases, where the pixel count is a relatively low pixel count, the presentation rendered by the pixel count may result in a comparatively low quality visual image.

At operation 404, as may be performed by the performance monitor 302 of FIG. 3, the method 400 then monitors a visual performance metric associated with the presentation of the virtual game environment. As described above, a frame rate is an example of a visual performance metric. A frame rate may be determined, in some embodiments, by measuring the time it takes to generate a single frame of the game or complete a game loop used to generate a frame of the presentation of the virtual game environment. Operation 404 is explained in further detail below, with respect to FIG. 5.

At operation 406, the method 400 then updates the visual attribute based on the visual performance metric. Operation 406 may be performed by the presentation tuner 306 shown in FIG. 3. In some cases, operation 406 may be performed in response to detecting an adjustment condition, as may be detected by the performance monitor 302. As described above, an adjustment condition may occur when the monitored visual performance metric falls outside of a determinable value. By way of example and not limitation, the player, game developer, or system administrator may set a first configurable quality threshold value to signify a lower bound for the visual performance metric. If, for example, the visual performance metric falls below the first configurable quality threshold, a presentation adjustment condition is triggered. Additionally or alternatively, the player, game developer, or system administrator may set a second configurable quality threshold value to signify an upper bound for the visual performance metric. If, for example, the visual performance metric falls above the second configurable quality threshold, a presentation adjustment condition is also triggered.

Consistent with operation 408, the presentation tuner 306 may update the visual attribute to be useable to render the presentation of the virtual game environment according to a second visual quality. For example, when the presentation adjustment condition signifies that the frame rate of the presentation of the virtual game environment has fallen below a threshold level, the presentation tuner 306 may lower the pixel count associated with the game environment. A lower pixel count may produce a lower quality presentation (e.g., image) of the game environment. However, the lower quality presentation may require comparatively less computing resources to render an image of the virtual game environment. Consequently, adjusting the pixel count or any other suitable visual attribute may increase the frame rate associated with the presentation of the virtual game environment.

It is to be appreciated that some embodiments may perform the method 400 without requiring the player to set or adjust the visual attributes to achieve a desired performance metric. Automatic adjustments to the presentation quality of a game may provide convenient game play. Such may be the case because the gaming environment not only selects the visual attribute (e.g., pixel count) that is to be adjusted, but the gaming environment also selects how much to adjust the visual attribute. It is to be appreciated that the gaming environment can adjust the visual attribute to lower or increase the visual quality.

Figure 5:
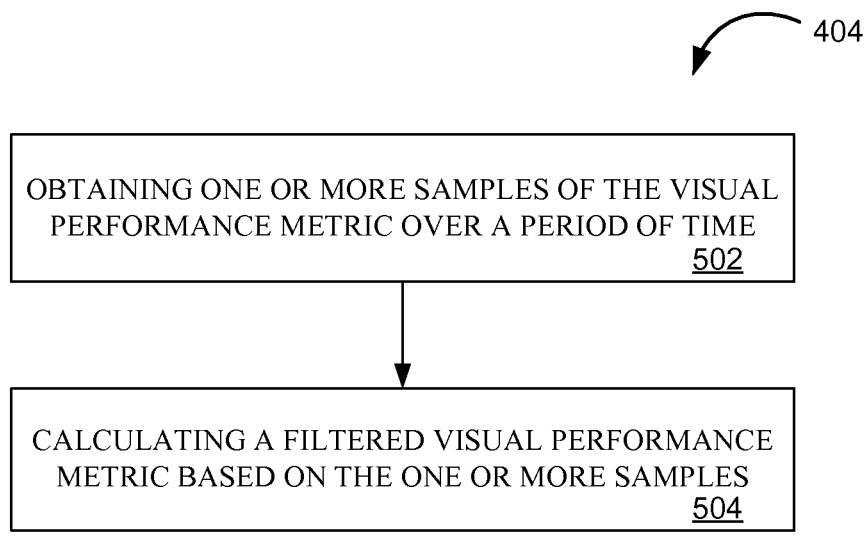
FIG. 5 is a flow chart illustrating a method of monitoring a visual performance metric, according to an example embodiment.

FIG. 5 is a flow chart illustrating a method 500 of monitoring a visual performance metric, according to an example embodiment. In some embodiments, the method 500 may implement operation 404 of FIG. 4. Further, in an embodiment, the method 500 may be implemented by the components and modules shown in FIGS. 1 and 3.

The method 500 may begin at operation 502 when one or more samples of the visual performance metric are obtained over a period of time. To illustrate, the performance monitor 302 may monitor the performance metric of the presentation module 304. In cases where the performance monitor 302 monitors the frame rate of the presentation, the performance monitor 302 may track how long the presentation module 304 takes to render a determinable number of game displays.

At operation 504, the method 500 may then calculate a filtered visual performance metric based on the one or more samples. As used herein, the term "filtered visual performance metric" may refer to a measurement of a visual performance metric that is based on past samples of the visual performance metric. To illustrate, a filtered visual performance metric of a frame rate may be based on a function of the current frame rate (as is determined by the most recent sample) and prior frame rates (as may be maintained based on past samples). In some cases, a filtered visual performance metric may be useful in ignoring jitters in performance.

By way of illustration and not limitation, an example embodiment may perform method 500 to monitor a frame rate (or frame time) associated with a presentation of a virtual game environment. For example, after a determinable number of frames have been rendered, the performance monitor 302 may calculate a filtered frame time. The filtered frame time may be calculated according to the following formula:

filteredFT=(filteredFT*PF_INFLUENCE)+
(currentFT*CF_INFLUENCE)

where the variable currentFT may represent a measurement of time taken by the presentation module 304 to render the most recent frame or to execute the most recent game loop. The variable filteredFT may represent a filtered frame time (e.g., a measurement of time taken to render past frames or execute past game loops). The variable PF_INFLUENCE may represent a weight to be given to the filtered frame time (e.g., filteredFT) calculated during the previous frames (the PF in PF_INFLUENCE signifies previous frames). On the other hand, the variable CF_INFLUENCE may represent a weight to be given to the current frame time (e.g., currentFT) calculated the most recent frame (the CF in CF_INFLUENCE signifies current frame). In general, the variables PF_INFLUENCE and CF_INFLUENCE may be weights used to determine how much influence a current frame time is to be given relative to the filtered frame time. Merely for illustration, where the method 500 is configured to calculate a filtered frame time using the 100 most recent frames, the PF_INFLUENCE may be set to 0.99 and CF_INFLUENCE may be set to 0.01. As a result, the filtered frame time may smooth out any spikes in the performance of recent samples. In essence, some embodiments may use the PF_INFLUENCE and CF_INFLUENCE as a low pass filter.

It is to be appreciated that some embodiments may convert or otherwise transform a visual performance metric from one measurement to another. For example, after the filtered frame time (e.g., filteredFT) is calculated, the performance monitor 302 may convert the filtered frame time to filtered frames per second (or filtered frame rate) by taking the inverse of the filtered frame time.

Figure 6:
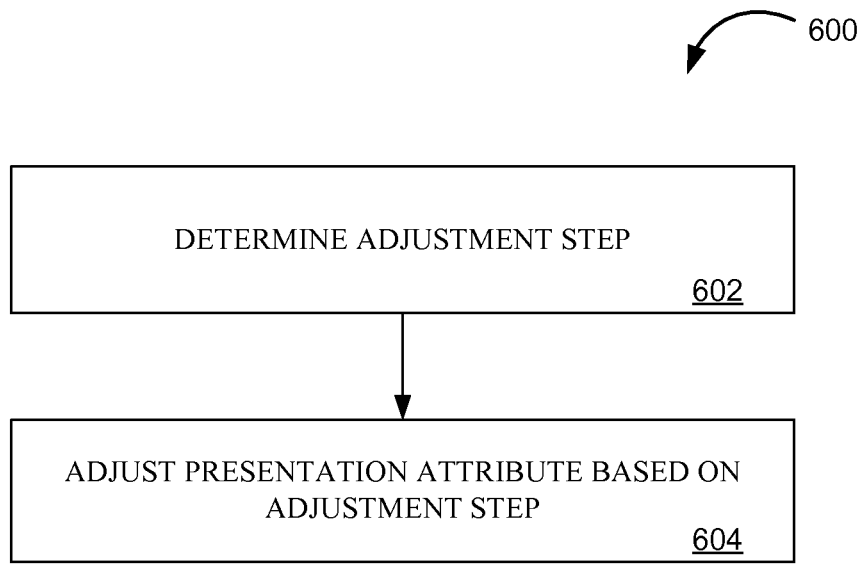
FIG. 6 is a flow chart illustrating a method of adjusting a visual attribute, according to an example embodiment.

FIG. 6 is a flow chart illustrating a method 600 of adjusting a visual attribute, according to an example embodiment. The method 600 may be performed, in some embodiments, in connection with operation 406 of FIG. 4. In an embodiment, the method 600 may be implemented by the components and modules shown in FIGS. 1 and 3, such as the presentation tuner 306 of FIG. 3.

The method 600 may begin when, at operation 602, an adjustment step is determined. As used herein, the term "adjustment step" may refer to a unit of change is to be applied to the visual attribute. For example, in the context of pixels, the adjustment step may specify a number of pixels to increase or decrease the total pixel count of a presentation of a virtual game environment. In other embodiments, in the context of graphical models, the adjustment step may specify a visual model that is to be used in generating a presentation of the virtual game environment.

In some embodiments, the adjustment step may be a constant value that updates the visual attribute when a presentation adjustment condition is detected. For example, the following code may use a constant value to determine an adjustment step for a pixel count:

deltaPixels=CONSTANT_VALUE;

Where CONSTANT_VALUE is a constant value (as may be set by the game developer, player, or administrator).

In other embodiments, the adjustment step may be a value that is calculated based on a distance function. A used herein, the term "distance function" may be used to refer to some function that measures the distance between the visual performance metric and a determinable threshold (e.g., an upper or lower bound for performance). For example, the following code may illustrates an example of determining an adjustment step for a pixel count based on a distance function involving available processing time:

pixelsPerTime=pixels/totalRenderTime timeDistance=TARGET_DURATION−filteredFrameTime deltaPixels=timeDistance*pixelsPerTime Where 'pixelsPerTime' is a variable that determines the computing time it takes to render a single pixel, which is calculated based on 'pixels,' a variable that specifies a number of pixels rendered in the presentation of the virtual game environment, and 'totalRenderTime,' a variable that specifies the total computation time used to render the presentation of the virtual game environment; 'timeDistance' is a variable that specifies the distance between the target time (as represented by the variable 'TARGET_DURATION') in rendering a frame of the virtual game environment and the time currently consumed to render a frame (as represented by the variable 'filteredFrameTime'); and deltaPixels is a variable specifying the adjustment step as a function of the 'timeDistance' and 'pixelsPerTime.'

In some embodiments, operation 602 may scale the adjustment step to account for the overhead of stretching or shrinking an image and to prevent bouncing or jittering around the desired frame time. For example, some embodiments, may utilize the following function:

deltaPixels=deltaPixels*SCALE_VALUE;

where 'SCALE_VALUE' is a variable that determines an amount to scale the adjustment step (e.g. 'deltaPixels'). In some embodiments, the particular value for the 'SCALE_VALUE' may be based on a function of the 'timeDistance.' For example, where the 'timeDistance' indicates that the time it takes to render a frame is less than the target time, the SCALE_VALUE may be one value (e.g., 0.9), while where the 'timeDistance' indicates that the time it takes to render a frame is greater than the target time, the SCALE_VALUE may be another value (e.g., 1.1).

With continued reference to FIG. 6, after the adjustment step is determined, operation 604 then updates the visual attribute to incorporate the adjustment step. For example, where the visual attribute represents a pixel count, the visual attribute is incremented or decremented by the adjustment step. As a further example, where the visual attribute specifies a graphical model, the visual attribute is assigned the adjustment step.

In some embodiments, adjusting the visual attribute may affect one or more other visual attributes. For example, an update to a pixel count may in turn involve adjusting a display size associated with the presentation of a virtual game environment. For example, the following code may be used to calculate the new display size associated with an adjustment to a pixel count:

```
viewportAreaSquareRoot = SquareRoot( pixels +
    deltaPixels );
ratio = viewportAreaSquareRoot /
    fullSizedAreaSquareRoot;
If( ratio > 1.0 ) {
    ratio = 1.0;
}
If( ratio < MIN_SCALING_RATIO ) {
    ratio = MIN_SCALING_RATIO;
}
viewportWidth = fullSizedWidth * ratio;
viewportHeight = fullSizedHeight * ratio;
```

Where, 'viewportAreaSquareRoot' is a variable that specifies the area of a view port (the term "viewport" may refer to a region of a display screen used to display a presentation of a virtual game environment); SquareRoot is a function that calculates the square root of an input variable; 'ratio' is the ratio between the viewport size, as represented by the variable 'viewportAreaSquareRoot', and the full size of the image, as represented by the variable 'fullSizedAreaSquareRoot;' MIN_SCALING_RATIO is variable that sets a lower bound for a scaling ratio; 'viewPortWidth' is the width of the new display; and 'viewportHight' is the height of the new display.

Although many of the embodiments described above operate by adjusting a pixel count, it is to be appreciated that other embodiments may operate by adjusting other visual attributes. For example, in some embodiments, the presentation module 304 may generate presentation of the virtual game environment using various visual models. For example, one visual model may cause the presentation module 304 to render images with textured surfaces, degrees of animation, shadows, and other suitable visual effects. Accordingly, based on the visual performance metric, the presentation tuner 306 may adjust the models used by the presentation module 304 to generate the presentation of the virtual game environment. For example, if the frame rate drops below a threshold value, the presentation timer 306 may turn off or disable a model related to a particular visual effect (e.g., textured surfaces). In other embodiments, rather than turning off or disabling a model, the presentation tuner 306 may select a different visual model (e.g., a model that takes more or less computation time to render).

It is also to be appreciated that the visual attribute may be associated with all of, or any part of, the virtual game environment. For example, some embodiments may use a visual attribute to identify a pixel count for the whole virtual game environment and corresponding in-game objects. Other embodiments may use a visual attribute to identify a pixel count, for example, for individual in-game objects. For example, in a virtual farming game, a first visual attribute may be used to identify the pixel count or visual model for a virtual water object (or objects), a second visual attribute may be used to identify the pixel count or visual model for a virtual crop game objects (or objects), and a third visual attribute may be used to identify the pixel count or visual model for a non-player character (or characters).

Example Gaming Platforms

A virtual game may be hosted by the gaming platform 112, which can be accessed using any suitable connection 110 with a suitable client device 104. A user may have a game account on the gaming platform 112, wherein the game account may contain a variety of information associated with the user (e.g., the user's personal information, financial information, purchase history, player character state, game state, etc.). In some embodiments, a user may play multiple games on the gaming platform 112, which may maintain a single game account for the user with respect to the multiple games, or multiple individual game accounts for each game with respect to the user. In some embodiments, the gaming platform 112 may assign a unique identifier to a user 102 of a virtual game hosted on the gaming platform 112. The gaming platform 112 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and controls the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the gaming platform 112). For example, the client device 104 may download client components of a virtual game, which are executed locally, while a remote game server, such as the gaming platform 112, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the gaming platform 112.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the gaming platform 112, which is managed by the game operator. In other embodiments, the social graph is part of a social networking system 108 managed by a third party (e.g., Facebook, Friendster, Myspace). In yet other embodiments, the user 102 has a social network on both the gaming platform 112 and the social networking system 108, wherein the user 102 can have a social network on the gaming platform 112 that is a subset, superset, or independent of the user's social network on the social networking system 108. In such combined systems, game network system 112 can maintain social graph information with edge-type attributes that indicate whether a given friend is an "in-game friend," an "out-of-game friend," or both. The various embodiments disclosed herein are operable when the social graph is managed by the social networking system 108, the gaming platform 112, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In the social graph 200, it is possible for individuals to be connected to other individuals through their first-degree friends (e.g., friends of friends). As described above, the number of edges in a minimum path that connects a user to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_3$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of users, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that can be the case.

Figure 7:
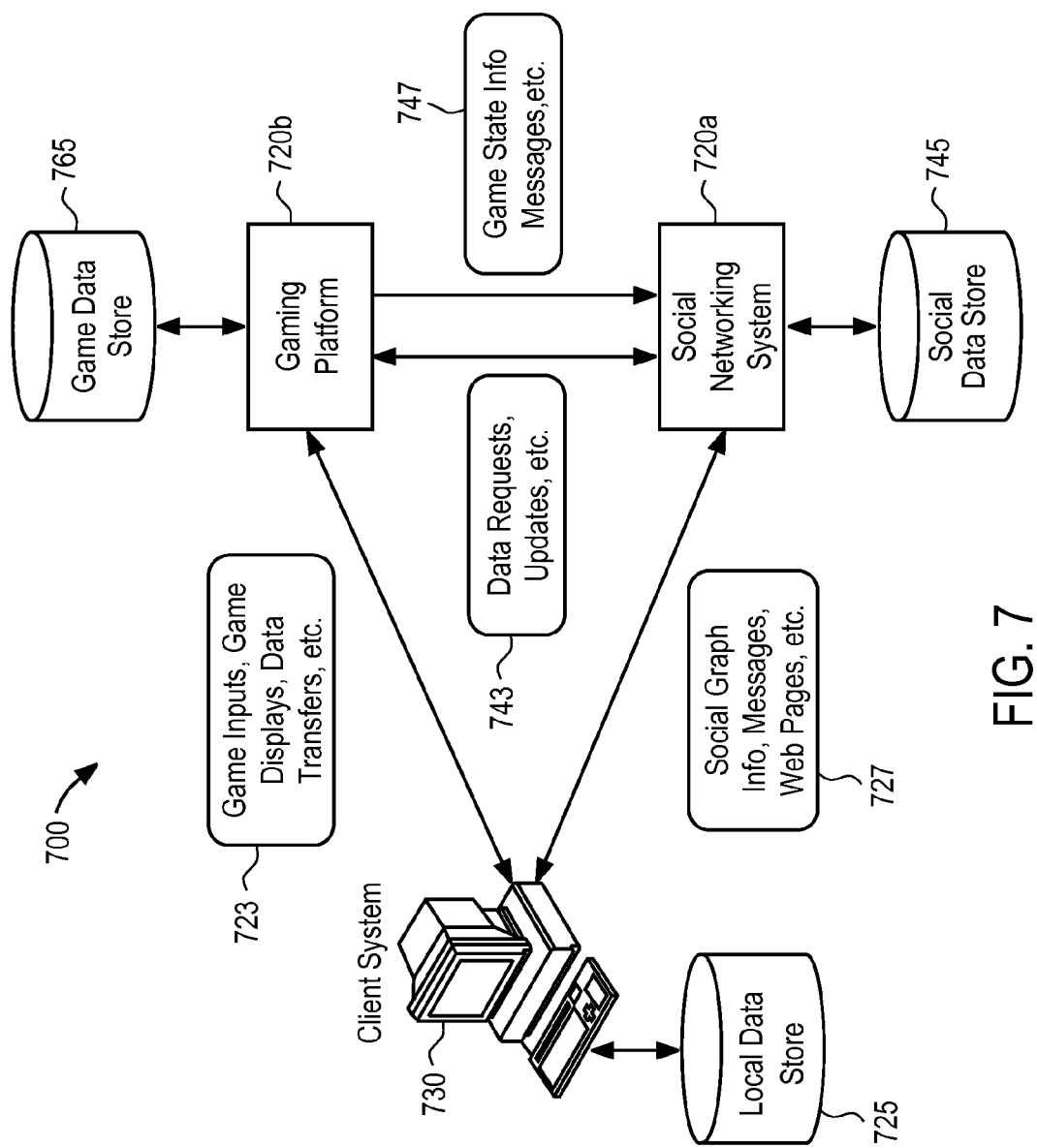
FIG. 7 illustrates an example data flow between example components of the example system of FIG. 1, according to some embodiments.

FIG. 7 illustrates an example data flow between example components of an example system 700. One or more of the components of the example system 700 may correspond to one or more of the components of the example gaming environment 100. In some embodiments, the system 700 includes a client system 730, a social networking system 720a, and a gaming platform 720b. The components of system 700 can be connected to each other in any suitable configuration, using any suitable type of connection. The components may be connected directly or over any suitable network. The client system 730, the social networking system 720a, and the gaming platform 720b may have one or more corresponding data stores such as local data store 725, social data store 745, and game data store 765, respectively.

The client system 730 may receive and transmit data 723 to and from the gaming platform 720b. This data can include, for example, a web page, a message, a game input, a game display, a HTTP packet, a data request, transaction information, and other suitable data. At some other time, or at the same time, the gaming platform 720b may communicate data 743, 747 (e.g., game state information, game system account information, page info, messages, data requests, updates) with other networking systems, such as the social networking system 720a (e.g., Facebook, Myspace). The client system 730 can also receive and transmit data 727 to and from the social networking system 720a. This data can include, for example, web pages, messages, social graph information, social network displays, HTTP packets, data requests, transaction information, updates, and other suitable data.

Communication between the client system 730, the social networking system 720a, and the gaming platform 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the gaming platform 720b, the BLOB containing the game state for the instance corresponding to the user may be transmitted to the client system 730 for use by a client-side executed object to process. In some embodiments, the client-side executable is a FLASH-based game, which can de-serialize the game state data in the BLOB. As a user plays the game, the game logic implemented at the client system 730 maintains and modifies the various game state parameters locally. The client-side game logic may also batch game events, such as mouse clicks, and transmit these events to the gaming platform 720b. Gaming platform 720b may itself operate by retrieving a copy of the BLOB from a database or an intermediate memory cache (memcache) layer. The gaming platform 720b can also de-serialize the BLOB to resolve the game state parameters and execute its own game logic based on the events in the batch file of events transmitted by the client to synchronize the game state on the server side. The gaming platform 720b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 730. For example, a client application downloaded to the client system 730 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 720a. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 730, either caused by an action of a game user or by the game logic itself, the client system 730 may need to inform the gaming platform 720b of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game are represented as Adobe Flash objects. Flash may manipulate vector and raster graphics, and supports bidirectional streaming of audio and video. "Flash" may mean the authoring environment, the user, or the application files. In some embodiments, the client system 730 may include a Flash client. The Flash client may be configured to receive and run Flash application or game object code from any suitable networking system (such as, for example, the social networking system 720a or the gaming platform 720b). In some embodiments, the Flash client is run in a browser client executed on the client system 730. A user can interact with Flash objects using the client system 730 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 730, the Flash client may send the events that caused the game state changes to the in-game object to the gaming platform 720b. However, to expedite the processing and hence the speed of the overall gaming experience, the Flash client may collect a batch of some number of events or updates into a batch file. The number of events or updates may be determined by the Flash client dynamically or determined by the gaming platform 720b based on server loads or other factors. For example, client system 730 may send a batch file to the gaming platform 720b whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 730, the gaming platform 720b serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, gaming platform 720*b* may retrieve the corresponding BLOB from the database to determine the most-recent values of the game-related data. In some embodiments, while a user is playing the virtual game, the gaming platform 720*b* also loads the corresponding BLOB into a memory cache so that the game system may have faster access to the BLOB and the game-related data contained therein.

Figure 8:
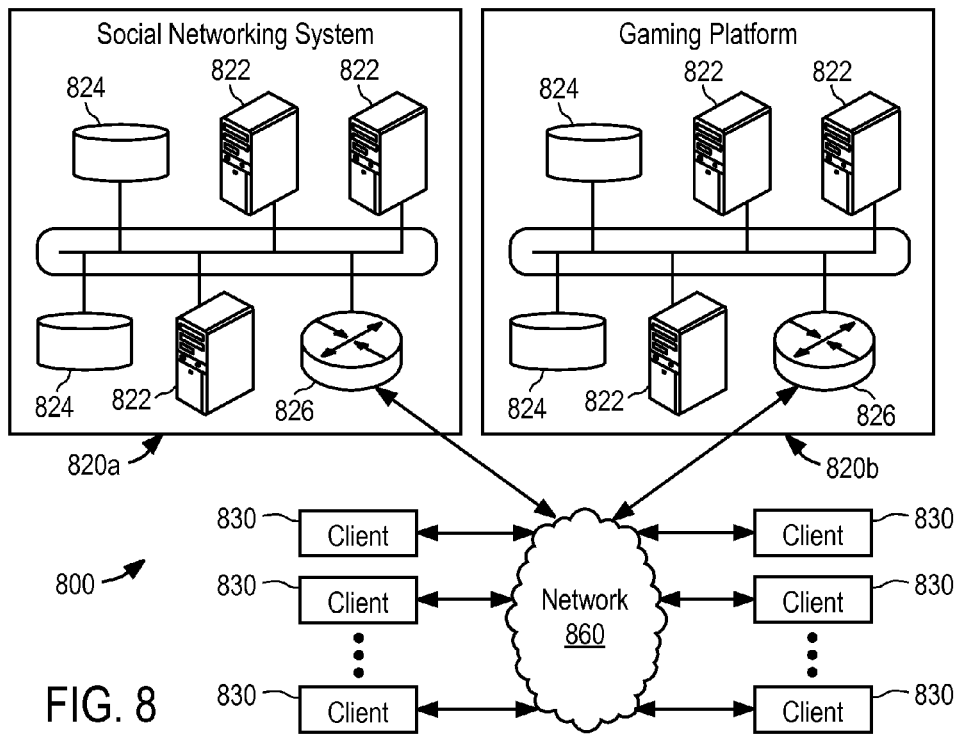
FIG. 8 illustrates an example network environment, in which various example embodiments may operate.

Various embodiments may operate in a wide area network environment, such as the Internet, including multiple network addressable systems. FIG. 8 illustrates an example network environment 800, in which various example embodiments may operate. Network cloud 860 generally represents one or more interconnected networks, over which the systems and hosts described herein can communicate. The network cloud 860 may include packet-based wide area networks (such as the Internet), private networks, wireless networks, satellite networks, cellular networks, paging networks, and the like. As FIG. 8 illustrates, various embodiments may operate in a network environment 800 comprising one or more networking systems, such as a social networking system 820*a*, a gaming platform 820*b*, and one or more client systems 830. The components of the social networking system 820*a* and the gaming platform 820*b* operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to the computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 822 may host functionality directed to the operations of the networking system 820. Hereinafter, the servers 822 may be referred to as server 822, although the server 822 may include numerous servers hosting, for example, the networking system 820, as well as other content distribution servers, data stores, and databases. The data store 824 may store content and data relating to, and enabling, operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, the data store 824 corresponds to one or more of a variety of separate and integrated databases, such as relational databases and object-oriented databases that maintain information as an integrated collection of logically related records or files stored on one or more physical systems. Structurally, the data store 824 may generally include one or more of a large class of data storage and management systems. In some embodiments, the data store 824 may be implemented by any suitable physical system(s) including components, such as one or more database servers, mass storage media, media library systems, storage area networks, data storage clouds, and the like. In one example embodiment, the data store 824 includes one or more servers, databases (e.g., MySQL), and/or data warehouses. Data store 824 may include data associated with different networking system 820 users and/or client systems 830.

The client system 830 is generally a computer or computing device including functionality for communicating (e.g., remotely) over a computer network. The client system 830 may be a desktop computer, laptop computer, personal digital assistant (PDA), in- or out-of-car navigation system, smart phone or other cellular or mobile phone, or mobile gaming device, among other suitable computing devices. The client system 830 may execute one or more client applications, such as a Web browser.

When a user at the client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 8 is described with respect to the social networking system 820*a* and the gaming platform 820*b*, this disclosure encompasses any suitable network environment using any suitable systems. For example, a network environment may include online media systems, online reviewing systems, online search engines, online advertising systems, or any combination of two or more such systems.

Figure 9:
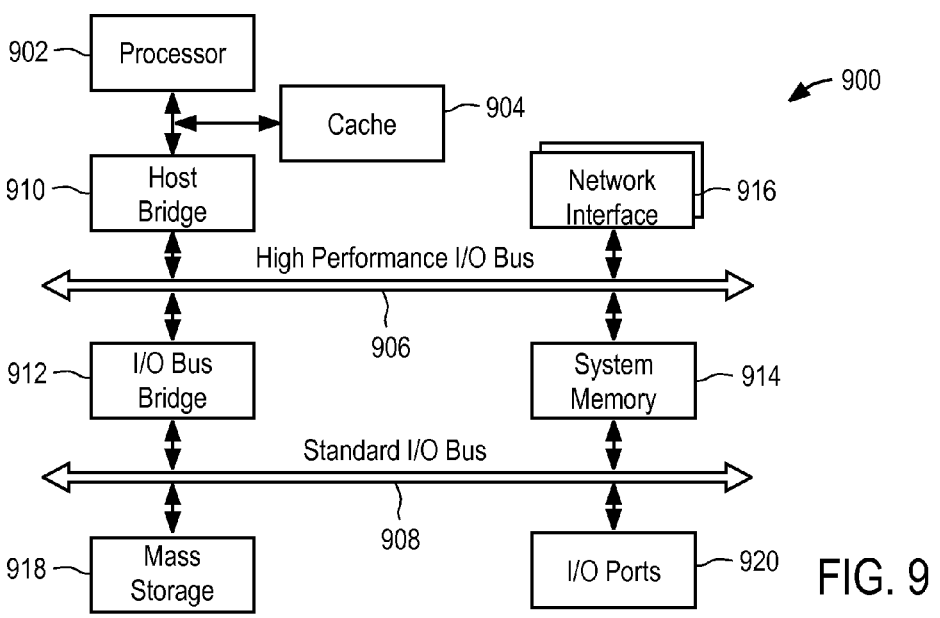
FIG. 9 illustrates an example computing system architecture, which may be used to implement one or more of the methodologies described herein, according to some embodiments.

FIG. 9 illustrates an example computing system architecture, which may be used to implement a server 922 or a client system 930. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in servers 922 of FIG. 8, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 900.

The hardware system 900 may include a variety of system architectures and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer system comprising:
   at least one processor;
   a presentation module implemented by the at least one processor and configured to cause a client device to render a sequence of frames, each frame being an image rendered according to a visual attribute;
   a performance monitor module implemented by the at least one processor and configured to monitor a visual performance metric associated with the sequence of frames rendered on the client device; and
   a presentation tuner module implemented by the at least one processor and configured to adjust the visual attribute based on the visual performance metric associated with the sequence of frames, wherein the presentation module is further configured to cause the client device to render a subsequent sequence of frames, each frame from the subsequent sequence being rendered according to the adjusted visual attribute.

2. The computer system of claim 1, wherein the visual performance metric is a measurement relating to a frame rate of the presentation of the virtual game environment on the client device.

3. The computer system of claim 1, wherein the visual attribute represents a pixel count for the images of the sequence of frames.

4. The computer system of claim 1, wherein updating the visual attribute based on the visual performance metric comprises comparing the presentation quality metric with a threshold quality value.

5. The computer system of claim 1, wherein monitoring the visual performance metric further comprises:
   calculating a filtered visual performance metric over a period of time; and
   detecting a presentation adjustment event based on a comparison of the filtered visual performance metric with a threshold quality value.

6. The computer system of claim 5, wherein the period of time is a rolling window representing a recent period of time.

7. The computer system of claim 1, wherein the visual attribute associated with the presentation of the virtual game environment is a visual model that defines a visual effect used in rendering one or more virtual objects displayed in the virtual game environment.

8. The computer system of claim 1, wherein updating the visual attribute further comprises selecting a different visual model usable in rendering one or more virtual objects displayed in the virtual game environment.

9. The computer system of claim 1, wherein updating the visual attribute further comprises using a distance function to determine a step value used to change the visual attribute, the distance function measuring a distance between the visual performance metric and a threshold value.

10. The computer system of claim 1, wherein the presentation tuner module is configured to update the visual attribute based further on a distance function, the distance function measuring a distance between the visual performance metric and a threshold value.

11. A computer-implemented method, comprising:
   causing a client device to render a sequence of frames, each frame being an image rendered according to a visual attribute;
   monitoring, using one or more processors, a visual performance metric associated with the sequence of frames rendered on the client device;
   adjusting the visual attribute based on the visual performance metric associated with the sequence of frames; and
   causing the client device to render a subsequent sequence of frames, each frame from the subsequent sequence being rendered according to the adjusted visual attribute.

12. The computer-implemented method of claim 11, wherein the visual performance metric is a measurement relating to a frame rate of the presentation of the virtual game environment on the client device.

13. The computer-implemented method of claim 11, wherein the visual attribute represents a pixel count for the images of the sequence of frames.

14. The computer-implemented method of claim 11, wherein updating the visual attribute based on the visual performance metric comprises comparing the presentation quality metric with a threshold quality value.

15. The computer-implemented method of claim 11, wherein monitoring the visual performance metric further comprises:
   calculating a filtered visual performance metric over a period of time; and
   detecting a presentation adjustment event based on a comparison of the filtered visual performance metric with a threshold quality value.

16. The computer-implemented method of claim 15, wherein the period of time is a rolling window representing a recent period of time.

17. The computer-implemented method of claim 11, wherein the visual attribute associated with the presentation of the virtual game environment is a visual model that defines a visual effect used in rendering one or more virtual objects displayed in the virtual game environment.

18. The computer-implemented method of claim 11, wherein updating the visual attribute further comprises selecting a different visual model usable in rendering one or more virtual objects displayed in the virtual game environment.

19. The computer-implemented method of claim 11, wherein updating the visual attribute further comprises using a distance function to determine a step value used to change the visual attribute, the distance function measuring a distance between the visual performance metric and a threshold value.

20. A computer-readable storage medium storing at least one program that, when executed by at least one processor, causes the at least one processor to perform operations comprising:
   causing a client device to render a sequence of frames, each frame being an image rendered according to a visual attribute;
   monitoring, using one or more processors, a visual performance metric associated with the sequence of frames rendered on the client device;
   adjusting the visual attribute based on the visual performance metric associated with the sequence of frames; and
   causing the client device to render a subsequent sequence of frames, each frame from the subsequent sequence being rendered according to the adjusted visual attribute.

* * * * *

UNITED STATES PATENT AND TRADEMARK OFFICE
CERTIFICATE OF CORRECTION

| | | |
|---|---|---|
| PATENT NO. | : 8,998,716 B2 | Page 1 of 1 |
| APPLICATION NO. | : 13/969781 | |
| DATED | : April 7, 2015 | |
| INVENTOR(S) | : Gregory Omi | |

It is certified that error appears in the above-identified patent and that said Letters Patent is hereby corrected as shown below:

IN THE DRAWINGS

Sheet 5 of 7, Fig. 5, delete "404" and insert --500--, therefor

IN THE SPECIFICATION

In column 6, line 10, delete "useable" and insert --usable--, therefor

In column 9, line 23, delete "timer" and insert --tuner--, therefor

In column 11, line 33, delete "User" and insert --Player--, therefor

In column 11, line 42, delete "User" and insert --Player--, therefor

In column 12, line 5, delete "$3_3$ 232" and insert --$3_2$ 232--, therefor

IN THE CLAIMS

In column 19, line 19, in Claim 11, delete "processers," and insert --processors,--, therefor In column 20, line 32, in Claim 20, delete "processers," and insert --processors,--, therefor Signed and Sealed this
Sixth Day of October, 2015

Michelle K. Lee
*Director of the United States Patent and Trademark Office*